No. 741,041. Patented October 13, 1903.

UNITED STATES PATENT OFFICE.

MAX HARRIS JUST, OF NEW YORK, N. Y.

COFFEE SUBSTITUTE.

SPECIFICATION forming part of Letters Patent No. 741,041, dated October 13, 1903.

Application filed May 22, 1903. Serial No. 158,325. (No specimens.)

*To all whom it may concern:*

Be it known that I, MAX HARRIS JUST, a citizen of Galicia, Austria, residing at New York, in the county of New York and State of New York, have invented certain new and useful Improvements in Coffee Compounds, of which the following is a specification.

This invention relates to compounds which are used as substitutes for coffee.

The object of the invention is to avoid the headaches, nervousness, indigestion, and other injurious and disagreeable conditions which usually attend the constant use of coffee and harmlessly to satisfy the craving and stimulate the health of habitual coffee-drinkers who experience its ill effects, but are unable to discontinue its use.

The object I have recited is attained by the employment as a substitute for coffee of an improved composition of matter which is produced by combining the following ingredients substantially in the proportions set forth: lupinen, twenty per cent.; figs, twenty per cent.; beans, thirty per cent.; malt, thirty per cent.

In producing my compound the ingredients are mixed thoroughly together and comminuted preparatory to using.

Although any preferred character of bean possessing the necessary qualities may be employed in the production of my compound, I prefer to use the lupin, as this bean contains a large percentage of the nitrogenous substance, legumin, which is thoroughly nutritive in its action and possesses no injurious characteristics. Furthermore, this legumin is more easily assimilated than the constituents of ordinary coffee and is richer and more aromatic in flavor. It also deepens and improves the color of the beverage.

The lupinen which I employ is a glucoside extracted from the leaves of the *Lupinus albus*. Its action is stimulating and healthful, and it produces no undesirable or injurious effects even when used constantly.

The malt and figs are strengthening and beneficial in their action and impart a pleasing taste to the compound.

It is found that the most desirable effects attend the use of my improved coffee substitute, for it is not only agreeable and satisfactory in appearance and taste, but harmless in its nature and incapable of producing headaches, nervousness, or indigestion. Furthermore, it possesses distinctly medicinal ingredients and qualities.

Each of the ingredients which I employ is cheap and easy to procure, and the compound is therefore inexpensive.

If desired, I may combine sugar with the ingredients which I have named to produce a milder or sweeter compound.

I am aware that figs have been heretofore employed in a compound for flavoring coffee; but I am not aware that they have ever been used as an ingredient of a compound to be used as a substitute for coffee. Furthermore, while beans and malt have been employed alone I am not aware that they have been ever combined with lupinen and figs in the manner herein set forth.

Having thus described my invention, what I claim as new, and desire to secure by Letters Patent of the United States, is—

The herein-described composition of matter to be used as a substitute for coffee, consisting of two parts of lupinen, two parts of figs, three parts of lupins, and three parts of malt, substantially as described.

In testimony whereof I affix my signature in presence of two witnesses.

MAX HARRIS JUST.

Witnesses:
GOODMAN EDELSTEIN,
VICTOR GOLDBERG.